United States Patent [19]
Gurusami et al.

[11] Patent Number: 5,140,633
[45] Date of Patent: Aug. 18, 1992

[54] CABLE SUBSCRIBER CONTROL DEVICE USING SHARED JAMMING MODULES

[75] Inventors: Aravanan Gurusami, Syracuse; Robert Chamberlin, Manlius; Victor Jacek, Syracuse; Thomas Strong, LaFayette; Jeffrey Cox, Camillus, all of N.Y.

[73] Assignee: North American Philips Corporation, New York, N.Y.

[21] Appl. No.: 673,872

[22] Filed: Mar. 22, 1991

[51] Int. Cl.⁵ .................................. H04N 7/167
[52] U.S. Cl. .................................. 380/7; 380/6; 455/26.1; 358/349
[58] Field of Search .............. 380/6, 7, 8; 455/1, 455/26.1; 342/14; 358/349

[56]  References Cited
U.S. PATENT DOCUMENTS

| | | |
|---|---|---|
| 4,039,954 | 8/1977 | Toonder . |
| 4,367,557 | 1/1983 | Stern et al. . |
| 4,434,436 | 2/1984 | Kleykamp et al. ............... 380/6 X |
| 4,450,481 | 5/1984 | Dickinson . |
| 4,521,809 | 6/1985 | Bingham . |
| 4,769,838 | 9/1988 | Hasegawa . |
| 4,792,971 | 12/1988 | Uemura . |
| 4,825,468 | 4/1989 | Ellis ........................................ 380/7 |
| 4,912,760 | 3/1990 | West, Jr. et al. ....................... 380/7 |
| 5,014,309 | 5/1991 | West, Jr. ................................. 380/7 |

Primary Examiner—Tod Swann
Attorney, Agent, or Firm—Michael E. Marion

[57]  ABSTRACT

A device is disclosed for controlling access to cable television signals. Jamming oscillators are shifted in frequency, jamming multiple services each. The oscillators are shared between multiple subscriber ports, providing a cost effective, high security control system. A modular approach allows security to be added as additional capacity is required.

5 Claims, 3 Drawing Sheets 5,140,633

CABLE SUBSCRIBER CONTROL DEVICE USING SHARED JAMMING MODULES

BACKGROUND OF THE INVENTION

There is an increasing demand within the cable television (CATV) industry for a subscriber control device which resides outside of the subscriber's residence and which is fully controlled by the cable operator at the headend. Such a device would eliminate the need for individual set top subscriber units which translate all selected programming onto a single VHF channel and would therefore allow the subscriber to obtain full use of sophisticated features now available on television receivers and VCRs.

Such control devices allow all programming channels available to a cable subscriber to be selected by the subscriber's receiver or VCR, but these devices also incorporate means to selectively interdict or "jam" certain signals on those channels on a per subscriber basis in order to provide for pay television or subscription television services.

Existing devices include control systems in which multiple fixed oscillators are coupled to multiple subscribers through a switching matrix. The control capacity of such systems is limited however, because each oscillator interdicts a single signal. Systems have also been proposed which use one or more oscillators which are frequency agile and which can jump from one frequency to another under programmed control, in order to interdict more than one signal. Such systems however utilize a jamming unit containing oscillator and the associated control circuitry, for each subscriber. This is expensive in terms of physical size, power required and cost of materials.

One object of the invention therefore, is to provide a subscriber control device which provides substantial control of the program signals available to a cable subscriber but at reduced cost and increased efficiency and flexibility of service.

SUMMARY OF THE INVENTION

The instant invention comprises means for sharing control and jamming circuitry among a plurality of subscribers. The jamming circuitry comprises a plurality of jammer modules each comprising a plurality of frequency agile oscillators. The jammer modules are all controlled by a single processor. Each of the oscillators can be adjusted in frequency thereby, in order to generate jamming signals related to service signals provided by the CATV system for which access control is desired. The output of each oscillator is split and directed in multiple output paths, with each path containing an RF switch, such that control of the output is made available for each subscriber. The outputs of the switches related to the different oscillators and a common subscriber are then combined, providing a composite jamming signal for subscriber port.

In the described preferred embodiment, a subscriber control device comprising the invention, can provide control for four subscribers with up to 16 oscillators for control of sixteen service signals. It is to be understood however, that the number of subscribers served and the number of service signals controlled can be increased or decreased an still remain within the province of the invention.

Another feature of the invention is that it provides a modular design that allows the number of oscillators (reflecting the number of interdicable channels on a CATV system) to be varied as required. In otherwords, a cable operator can install a subscriber control device comprising the invention, for groups of subscribers. Initially for example, only four service signals might need to be controlled, i.e. four pay T.V. channels. Should however, the CATV operator later decide to provide eight or sixteen such services however, the control device can easily be modified by merely adding additional jammer modules comprising the additional oscillators.

Toward this end, the preferred embodiment of the invention provides jamming modules which each comprise four frequency agile oscillators. These modules can be added to the system as needed, providing the option of having 4, 8, 12, or 16 oscillators available for service access control. This provides a cost effective product when fewer oscillators are needed, while maintaining an effective method of upgrading service access control in the event that additional services are added to the system, without having to add redundant control and switching circuitry.

Another feature of the invention is to provide increased security effectiveness by implementing a unique method of combining noise to the jamming signal generated by each oscillator, creating a wide bandwidth of interference that will be impossible to extract from the video signal without also removing the video information itself.

DETAILED DESCRIPTION OF PREFERRED EMBODIMENTS OF THE INVENTION

Figure 1:
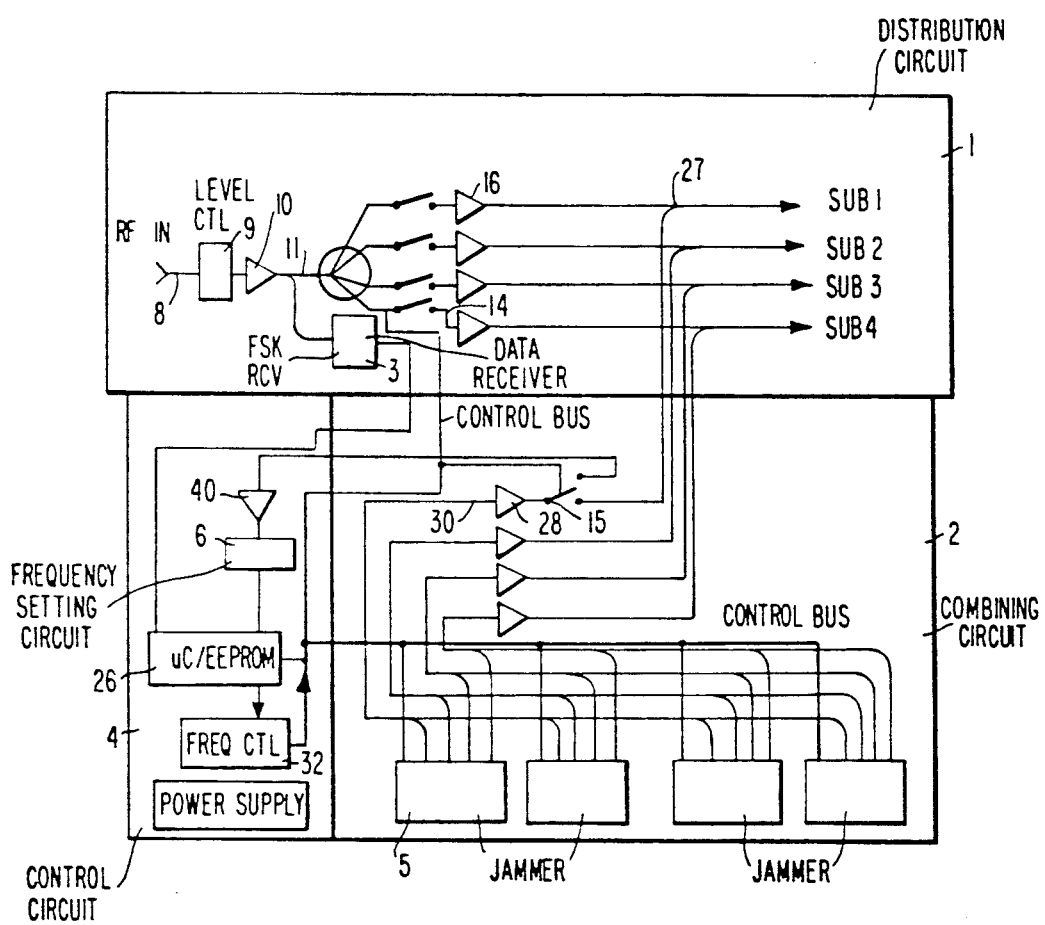
FIG. 1 is a diagram of the invention, showing the major functional elements.

FIG. 1 is a system diagram showing a subscriber control apparatus comprising one embodiment of the invention. This embodiment provides service signal control for four subscribers and can interdict up to sixteen service signals. Each service signal is interdicted ("jammed") using a frequency agile oscillator. Groups of four such jamming oscillators are comprised in each jammer module 5.

The RF distribution circuit 1 provides the path for the signals from the input port 8 to each of four subscriber ports, SUB 1 to SUB 4. Broadband cable television signals enter at a common input port 8 and pass through a level setting circuit 9 that may consist of existing attenuators, slope equalizers, and/or automatic gain control circuitry. An RF amplifier 10 raises the signal level and also prevents the jamming signals provided by the jammer modules 5, from exiting through the input port 8 and creating interference on the main cable television distribution system. The broadband signals then pass through a coupler 11, which directs a sample of the signal to the data receiver 3. The data receiver comprises a frequency shift key (FSK) demodulator and detects a plurality of code words sent by the headend to be used in conjunction with the processor to provide control for the subscriber control device, as described below.

The main output of coupler 11 then is divided by a signal splitter 13, generating 4 equal amplitude signal paths, one for each subscriber port. Each output of the signal splitter passes through a RF switch 14, which is controlled by the control circuit 4 over a control bus (for clarity shown coupled to only one RF switch but understood to provide control to each RF switch). Each RF switch 14 is opened to completely block all cable television services from the related subscriber port. When it is closed, all services pass through this point undisturbed. Each signal then passes through another RF amplifier 16 which raises the signal to the approximate desired output level, and also provides isolation so that the jamming signals do not travel backward through the circuit and cause interference on other subscriber ports.

The combiner circuit 2 provides for switching the outputs of the jammer modules 5 to one or more of the subscriber ports under the control of the control circuit. While not forming part of the combiner circuit, jammer modules 5 can be plugged into sockets or otherwise coupled to the combining circuit 2.

Each of the jammer modules 5 are coupled to output lines 30 which are each coupled to a coupler 27 in the distribution circuit 1. Each output line 30 comprises an amplifier 28 and a two pole switch 15 (shown herein for only one output line). A jamming signal for one of the subscriber ports first passes through a two pole RF switch 15. In one position, the switch allows for normal operation by allowing jamming signals to pass unaltered to coupler 27. In the second position, the frequency of each oscillator can be calibrated as described below.

When switch 15 is in the first position, the jamming signals provided by the jammer modules 5 are coupled through couplers 27 to each of the subscriber ports. The resulting signals are each a composite of the jamming frequencies and the unaltered cable television signals whereby reception of the unauthorized services is prevented.

The control circuit 4 comprises a processor 26 which can be a single chip microcontroller. It receives data from the headend through the data receiver 3. The data comprises a a frequency and authorization table of code words which are processed by the processor 26 to provide the desired control signals to the jammer modules 5, the combining circuit 2 and the distribution circuit 1 to generate jamming frequencies and gate them onto the appropriate subscriber drops. Software to achieve the desired switching and control operations described herein can be formulated without undue experimentation, by those skilled in the programming art. Such software can be adapted from automated switching, polling and calibration algorithms currently being used, for example, in conjunction with set top converters in the CATV industry.

Figure 2:
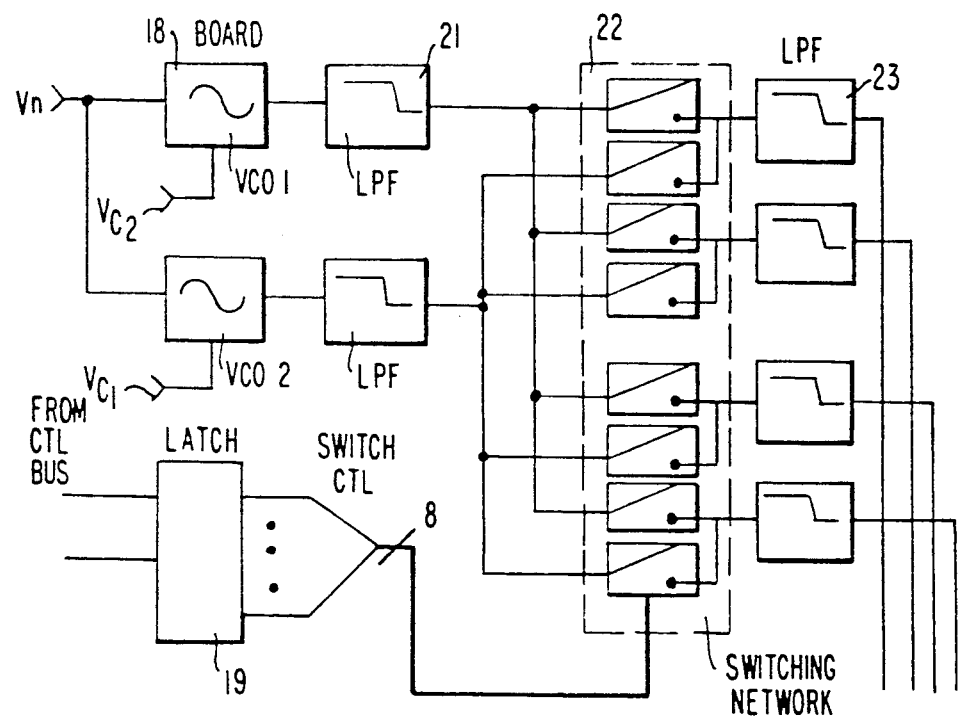
FIG. 2 is a diagram of a jammer module as shown in FIG. 1.
Figure 3:
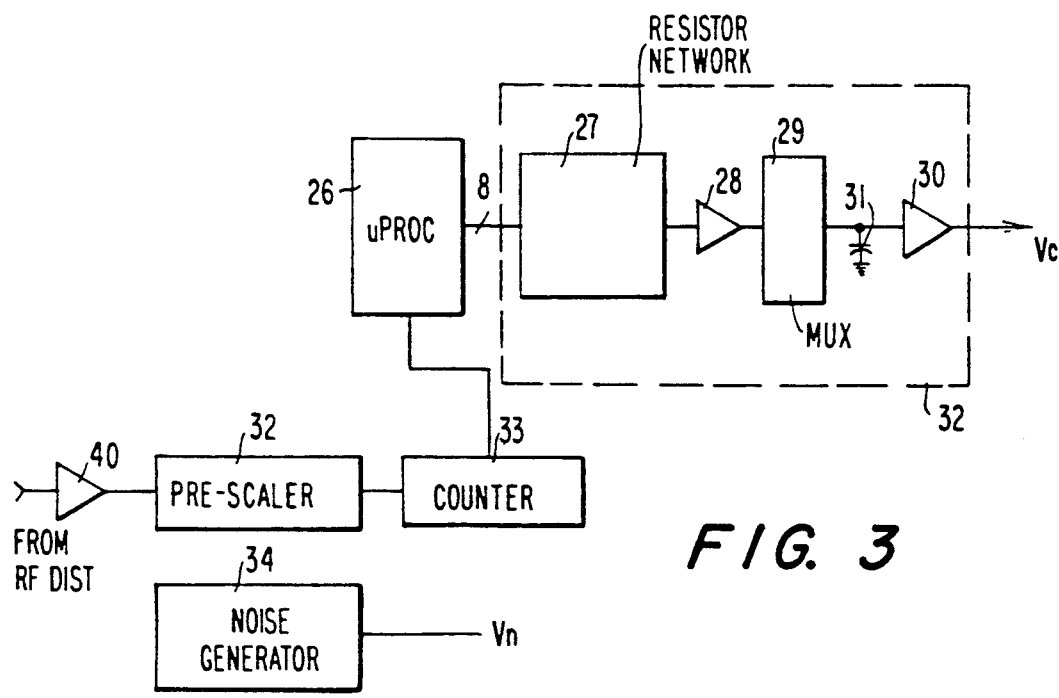
FIG. 3 is a diagram of the frequency control circuit shown in FIG. 1.

Each jammer module 5 comprises two circuit boards. Each circuit board, as described in FIG. 2, comprises two voltage controlled oscillators 18. The frequency of each oscillator 18 is determined by a control voltage Vc, as provided by control circuit 26, discussed below. A noise source signal provided by noise generator circuit 34, shown in this example as part of the control circuit (FIG. 3), generates a limited bandwidth of random noise that is distributed to the jammer modules 5.

Vn is superimposed on the control voltage Vc, causing a random variation of each VCO frequency. This causes the bandwidth of the resulting signal to be spread over a bandwidth equal to the bandwidth of the noise source Vn. This signal, when added to the cable television, causes interference to the television receiver that, because of the wide bandwidth of the carrier, completely masks the video content of the cable television service. In addition, the interfering carrier is virtually impossible to remove by any known filtering means without also removing the video content.

The output of each voltage controlled oscillator 18 passes through respective low pass filters 21 which remove unwanted products generated at harmonics of the desired jamming frequency. In this embodiment, each signal is then split four ways via a switching network 22, which could be any type of switching arrangement such as a resistor network, thereby providing a jamming signal for each of the four desired subscriber ports. The switching control on each board is provided by a logic circuit 19 which responds to control signals provided over the control bus, from control circuit 4. Although not shown in FIG. 2, the switching circuit 22 can also comprise and RF switch for each jamming signal output which, when closed by the control circuit 4, allows the respective jamming signal to pass. The outputs of the RF switches can then be combined and then passed through another low pass filter 23 to remove any harmonic distortion products that may have been generated by switching. The outputs of these low pass filters 23 are then directly combined with the corresponding signal outputs from the second board in each respective jammer module 5.

The signals generated by the jammer modules 5 are fed into the combining circuit 2 which combines the corresponding subscriber jamming singles into a composite jamming signal for each subscriber port.

Figure 4:
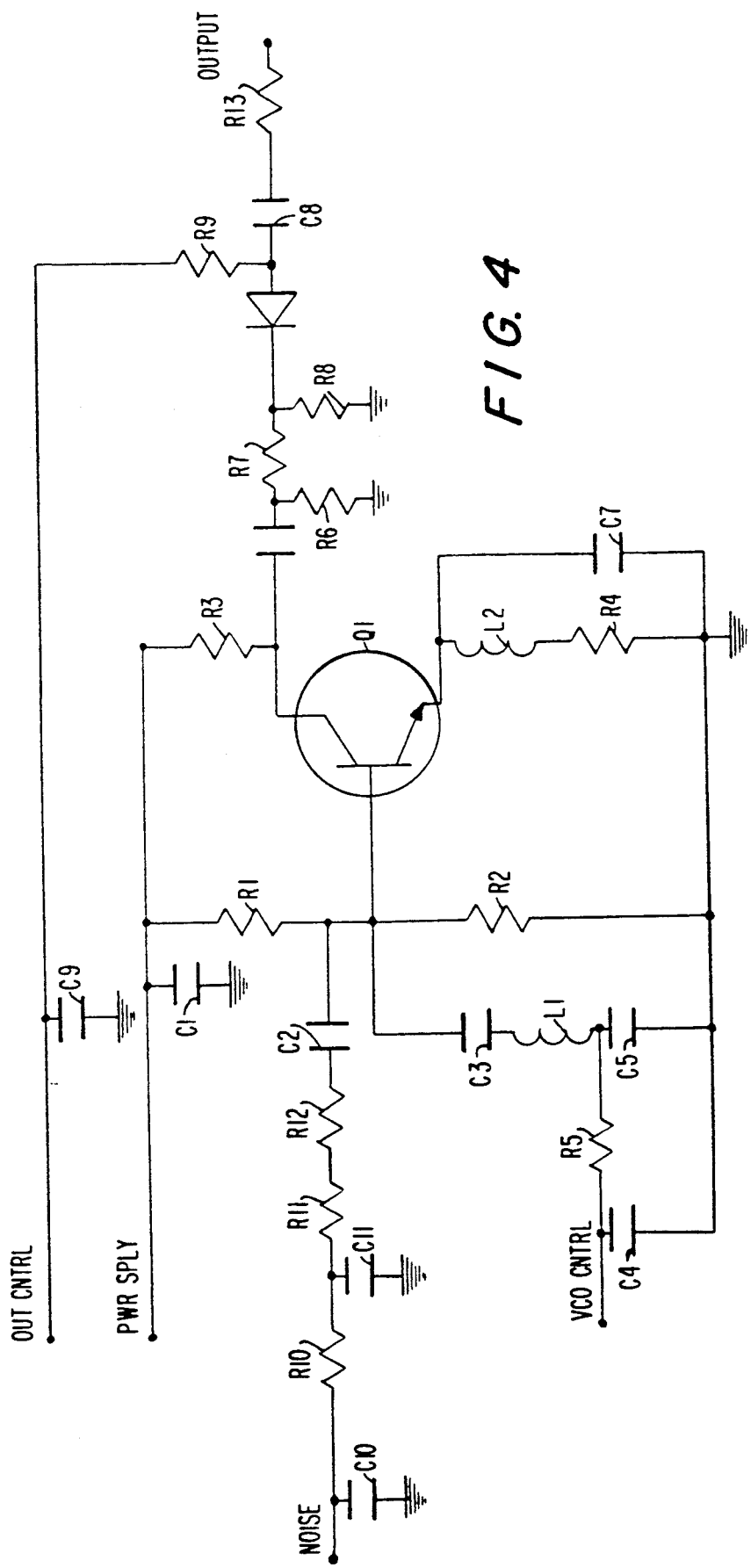
FIG. 4 is a schematic of a voltage controlled oscillator shown in FIG. 2.

As shown in FIG. 4, frequency control circuit 32 comprises a hybrid R/2R resistor network 27 and is driven by eight outputs to generate analog control voltages for the jamming oscillators 18 in the jammer modules 5. These voltages are buffered by a high speed op amp 28 and fed to a 1 to 16 analog multiplexer/demultiplexer 29. Each output of the multiplexer represents one of the 16 voltage controlled oscillators 18 (four per jammer module 5). The outputs Vc are buffered by an op-amp 30 and fed to the appropriate jammer module 5. The output of the op-amp is held by a capacitor 31 at the input so that the desired voltage is maintained while the multiplexer is disconnected from a given circuit. The processor 26 sequences through each of the oscillators in the jammer modules 5, opening the related switches, setting up the control voltage for the frequency desired, and then closing the switches. Under the direction of the processor 26, the jamming oscillators can be moved in frequency to generate interference on several service signals. Other oscillators can, at the same time, remain fixed on a single service, causing maximum interference.

The control circuit also provides a frequency setting circuit 6 comprising an RF amplifier 40 and a fixed divider circuit 33 which are used by the processor 26 to sample the output of each oscillator 18 to measure and set its operating frequency.

FIG. 4 describes one embodiment of a VCO which can be used in the jammer modules 5. The noise voltage can also be injected into the base of the oscillator transistor Q1 causing the amplitude of the jamming signal to vary randomly.

We claim:

1. A subscriber control apparatus for controlling access by a group of subscribers, to selected cable television signals comprising control data, said apparatus comprising:
 a) a plurality of interference generating circuits shared by each of said group of subscribers, each said interference generating circuit comprising a plurality of frequency agile oscillators which each generate a signal at a frequency which is controlled by a respective control voltage;
 b) a single distribution circuit coupled to a source of said cable television signals, each of said interference generating circuits, and each of said subscribers, which separates said control data from said cable television signals, and distributes, in response a plurality of control signals, at least one signal from at least one of said frequency agile oscillators to at least one of said subscribers; and
 c) a single control circuit coupled to said distribution circuit and said plurality of interference generating circuits, for receiving said control data and for providing therefrom, said respective control voltages to each of said frequency agile oscillators, and said control signals to said distribution circuit.

2. The apparatus of claim 1 wherein access to cable television services for multiple subscribers is controlled by superimposing an interfering carrier generated by at least one of said interference generating circuits onto first cable television signals within the frequency band of the service to be controlled.

3. The apparatus of claim 2 in which a respective control voltage of a first frequency agile oscillator is modified by a varying signal such that the output frequency of said first frequency agile oscillator is varied.

4. The apparatus of claim 2 in which a respective control voltage of a first frequency agile oscillator is superimposed with a bandwidth of random noise.

5. The apparatus of claim 1 wherein said interference generating circuits are plug in modules.

* * * * *